C. J. CLARK.
ROTARY GAS ENGINE.
APPLICATION FILED APR. 2, 1913.
1,146,848.
Patented July 20, 1915.
5 SHEETS—SHEET 2.
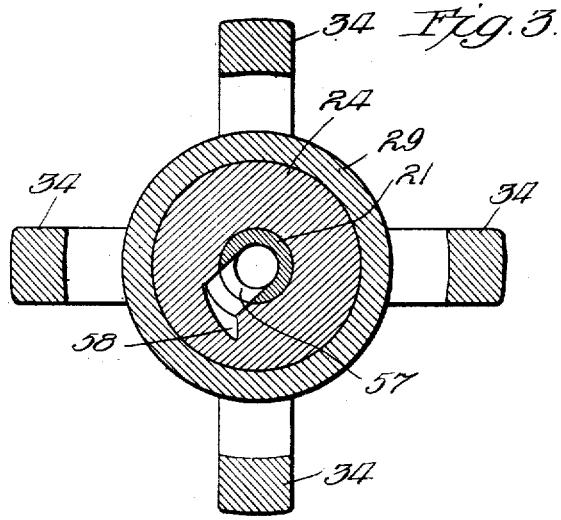
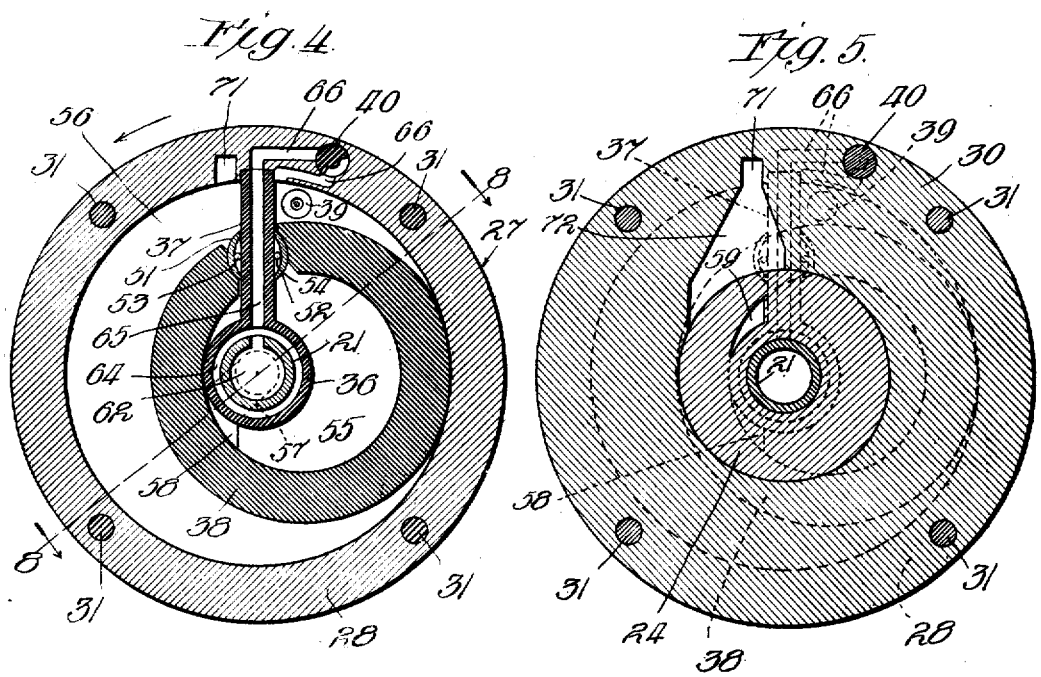
Witnesses:
Inventor:
Charles J. Clark
by Thomas H. Ferguson
Atty C. J. CLARK.
ROTARY GAS ENGINE.
APPLICATION FILED APR. 2, 1913.
1,146,848.
Patented July 20, 1915.
5 SHEETS—SHEET 3.
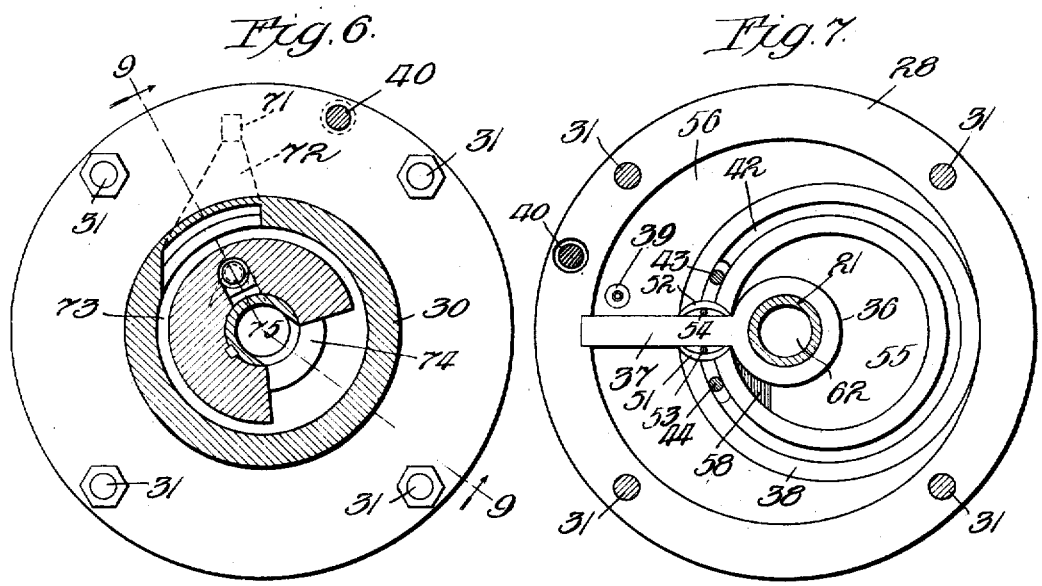
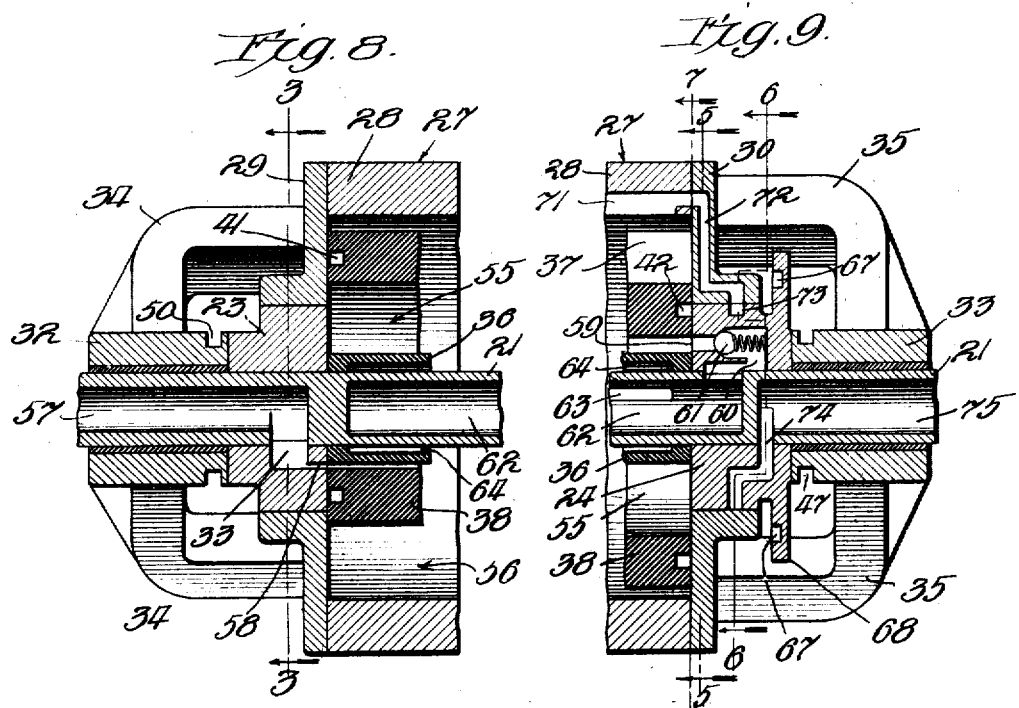
Witnesses:
Carolyn Nelson
Helen Mitchell
Inventor:
Charles J. Clark
By Thomas H. Ferguson
Atty

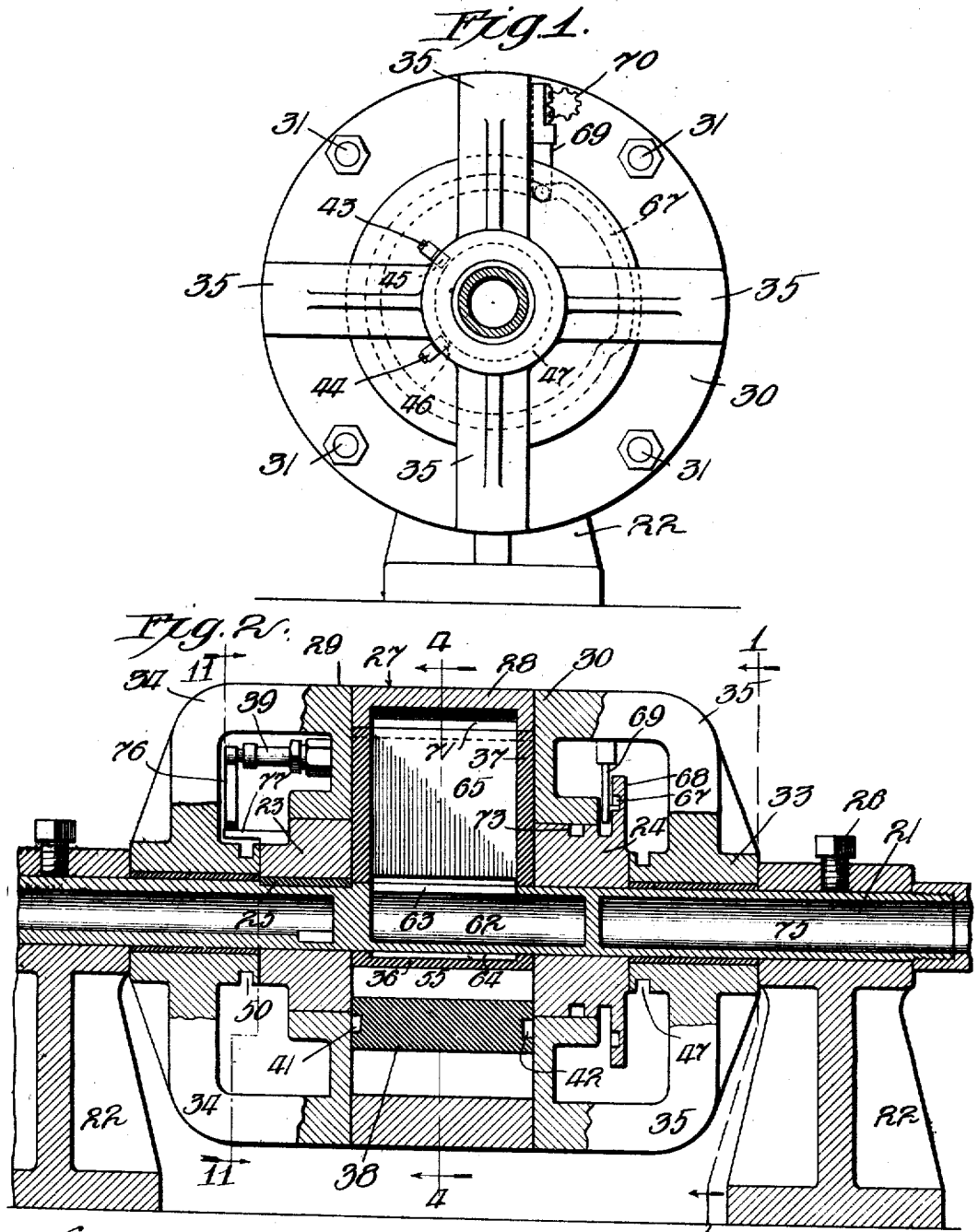

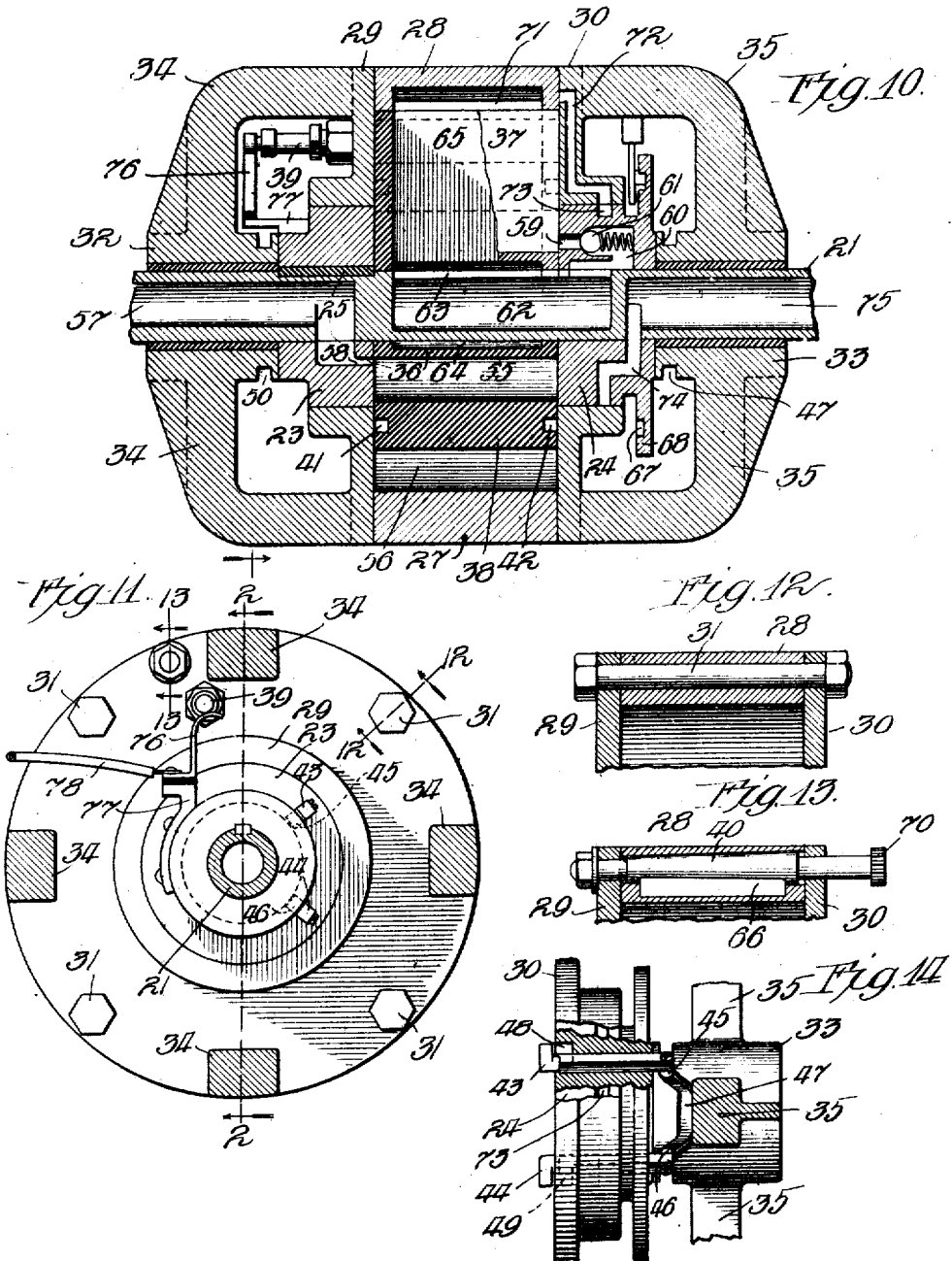

C. J. CLARK.
ROTARY GAS ENGINE.
APPLICATION FILED APR. 2, 1913.
1,146,848.
Patented July 20, 1915.
5 SHEETS—SHEET 5.
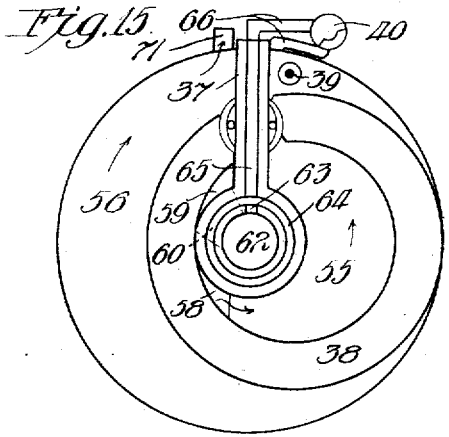
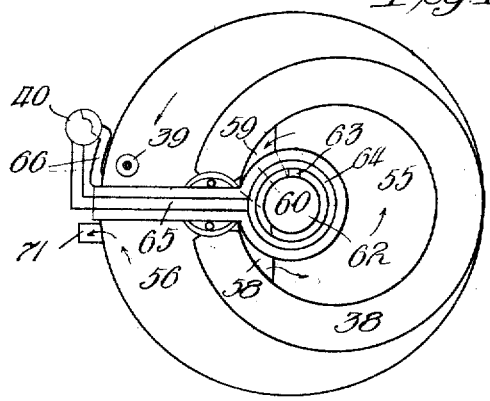
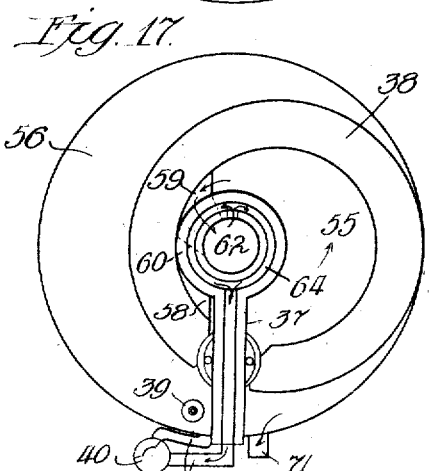
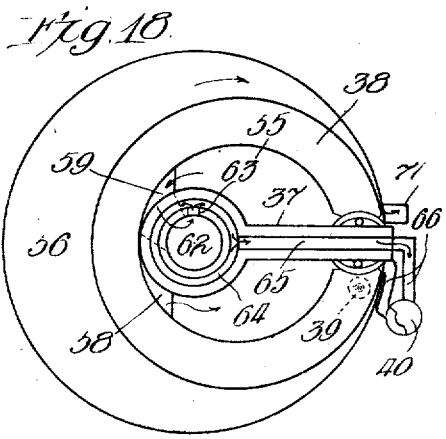
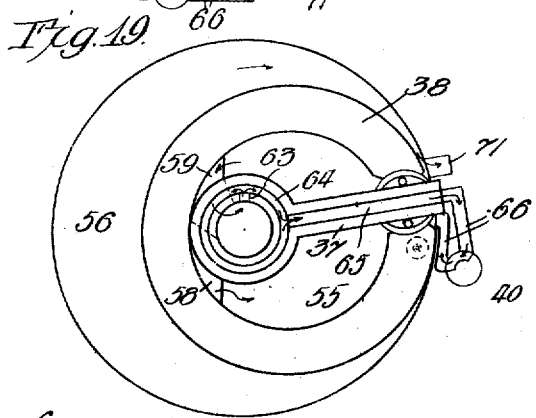
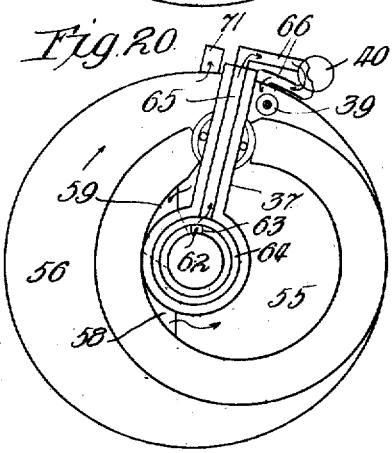
Witnesses:
Inventor:
Charles J. Clark
by Thomas H. Ferguson
Atty

UNITED STATES PATENT OFFICE.

CHARLES J. CLARK, OF CHICAGO, ILLINOIS, ASSIGNOR OF ONE-HALF TO JAMES B. DIBELKA, OF CHICAGO, ILLINOIS.

ROTARY GAS-ENGINE.

1,146,848.   Specification of Letters Patent.   Patented July 20, 1915.

Application filed April 2, 1913. Serial No. 758,377.

*To all whom it may concern:*

Be it known that I, CHARLES J. CLARK, a citizen of the United States, residing at Chicago, county of Cook, and State of Illinois, have invented certain new and useful Improvements in Rotary Gas-Engines, of which the following is a specification.

The present invention relates to rotary internal combustion engines, and the principal object of the invention is to provide an engine of this class which shall be efficient and durable in operation.

Rotary engines of the prior art have been, for the most part, so low in efficiency as to render them practically useless. One of the principal causes of low efficiency has been the great friction loss, due to the organization of the moving parts.

In carrying out my invention, I have provided a novel arrangement of parts by which the total friction of the engine is reduced to a minimum. In the specific form of the invention herein disclosed, I provide an outer cylinder joined to a hub at its center by a radial vane and locate a second cylinder eccentrically within the first and surrounding the hub so as to bear at one side against the outside of the hub and at the other side against the inside of the outer cylinder, slotting the inner cylinder to allow for the passage of the vane. By this construction, the rolling frictional engagement of the inner cylinder with the hub and with the outer cylinder greatly reduces the total friction. The arrangement is also such that the opposing forces in the engine are applied to the various parts most advantageously. That is to say, the retarding forces are applied near the center and the advancing forces near the periphery. The arrangement is also such as to provide, as nearly as possible, an even wear of the parts. The tightness of the joints between the relatively moving walls, which go to make up the explosion chamber, also increases under the pressure produced in the chamber. In operation, the products of combustion of exploded charges are completely forced out so as to leave incoming charges uncontaminated. All these several features and advantages, and other features and advantages, will be better understood upon consideration of the following detailed description taken in connection with the accompanying drawings, and the scope of the invention will be particularly pointed out in the appended claims.

In the drawings, Figure 1 is an end elevation of a rotary engine constructed in accordance with the present invention, the spindle being in section taken on a plane indicated by the line 1—1 of Fig. 2; Fig. 2 is a longitudinal vertical section of the same, the plane of section being indicated by the line 2—2 of Fig. 11; Fig. 3 is a transverse vertical section taken on a plane indicated by the line 3—3 of Fig. 8; Fig. 4 is a similar central section taken on a plane indicated by the line 4—4 of Fig. 2; Figs. 5, 6 and 7 are similar sections taken on planes indicated by the lines 5—5, 6—6 and 7—7, respectively, of Fig. 9; Fig. 8 is a vertical section of one end of the engine taken on a plane indicated by the line 8—8 of Fig. 4; Fig. 9 is a similar section of the opposite end taken on a plane indicated by the line 9—9 of Fig. 6; Fig. 10 is a section similar to Fig. 2, showing the ports and passages distorted from their true positions in order to illustrate the operation of the mechanism more clearly; Fig. 11 is an end elevation, parts being shown in section upon a plane corresponding to that indicated by the line 11—11 of Fig. 2; Figs. 12 and 13 are detailed sectional views taken on planes indicated by the lines 12—12 and 13—13, respectively, of Fig. 11; Fig. 14 is a detailed view illustrating the members for retaining the inner cylinder of the engine; and Figs. 15 to 20, inclusive, are diagrams illustrating the different positions of the parts during the rotation of the engine.

Throughout these views, like characters refer to like parts.

Upon reference to the drawings, it will be noted that the engine illustrated comprises a fixed element and a rotary element. The former includes a spindle 21 mounted on suitable supports 22 and having two heads 23 and 24 fixed to it, as by keys such as 25. The supports may be of any suitable form and the spindle may be secured to them in any suitable way, as by the set screws 26. The latter includes a cylindrical shell or casing 27 made up of a peripheral ring 28 and annular heads 29 and 30 suitably connected to the ring 28, as by bolts 31. The inner portion of the heads 29 and 30 bear upon and rotate over the peripheries of the fixed heads 23 and 24, respectively. The heads 29 and 30 are also connected to bearings 32 and 33 by a series of arms 34 and 35, respectively. These bearings bear upon the spindle 21 between the supports 22 and the fixed heads 23 and 24, respectively. The rotary element also includes a hub 36 which is journaled upon the spindle 21 between the fixed heads 23 and 24 and which is connected with the outer cylindrical casing 27 by a vane 37. The casing 27, hub 36 and vane 37 rotate as a unit about the spindle 21. In addition, the rotary element includes an inner ring or cylinder 38 which surrounds the hub 36 and is slotted to allow for the passage of the vane 37. A spark plug 39 and a control valve 40 are also mounted upon the outer cylinder 27 and rotate with it. The inner cylinder 38 is positioned as illustrated with its inner surface tangentially engaging the outer surface of the hub 36 and with its outer surface tangentially engaging the inner surface of the outer cylinder 27. The ring 38 is maintained in this position by guide pins passing through the fixed heads 23 and 24 to engage the grooves 41 and 42 in the opposite ends of the ring and to be drawn out of engagement therewith, one after the other, to clear the path of the vane 37 as it sweeps over the heads.

The pins for engaging the groove at one end of the ring 38 are illustrated in detail in the drawing. As shown in Fig. 14, these pins 43, 44 extend through openings in the head 24 and are adapted to be reciprocated therein. At their outer ends, they are provided with projections 45 and 46 which coöperate with a cam groove 47 to maintain the inner ends of the pins in engagement with the groove 42 and to draw them out of such engagement, one after the other, to permit the passage of the vane 37 as the engine rotates. As illustrated, the inner ends of these pins 43 and 44 have their inner ends extended laterally so as to increase their contact with the groove in the end of the ring. To provide for the reception of these lateral extensions of the pin 43, recesses 48 and 49 are provided in the head 24. The construction of pins for coöperation with the groove 41 at the opposite end of the ring 38 is the same as that just described. In the latter case, the projections upon the outer ends of the pins coöperate with a cam groove 50. From this description, it will be seen that as hub 36, vane 37 and cylinder 27 rotate upon the spindle 21, the inner cylinder 38 will have sliding engagement with the vane 37 and rolling frictional engagement with the hub 36 and cylinder 27. To prevent leakage at the point of engagement of the inner cylinder 38 with the vane 37, the opposite faces of the slot in the ring 38 are hollowed out for the reception of arcuate strips 51 and 52. Rollers 53 and 54 are located between these strips and the vane. By making the arcuate strips and the vane of hard metal, and the rollers 53 and 54 of relatively soft metal, the latter will be the first to wear out and can be readily replaced whenever necessary or desirable. It will be seen that with this construction, the movement of the rollers 53 and 54 toward either end from their mid-position will increase the pressure between the vane and the inner cylinder and thereby prevent leakage from the primary chamber 55, formed within the cylinder 38, and the secondary chamber 56, formed between the outer cylinder 27 and the inner cylinder 38.

In operation, gas or its equivalent is supplied to the primary chamber 55 where it is compressed and then is advanced into the secondary chamber at the rear of the vane to be exploded to advance the vane and its connected parts. Upon the subsequent rotation of the vane, the products of combustion, resulting from such explosion, are expelled from the secondary chamber. The fuel, which may be any of the hydrocarbon fuels commonly employed, is supplied to the primary chamber 55 through an inlet passage 57 extending through one end of the spindle 21 and a portion of the head 23 to an inlet port 58. The passage from the primary chamber 55 to that portion of the secondary chamber 56 in the rear of the vane 37 extends from an outlet port 59 through a passage 60 in the head 24, controlled by a spring-pressed check valve 61, into a compartment 62 formed within the spindle 21, thence through a slot 63 in the wall of said compartment to an annular compartment 64 in the hub 36, thence through a passage 65 in the vane 37 to a passage 66 in the peripheral wall of the outer cylinder 27 to the secondary chamber. The latter passage is controlled by the valve 40 which is tapered to fit a suitable conical bore in the wall 28 of the outer cylinder, as clearly illustrated in Fig. 13. It is cut away on one side so as to provide for the connection of the two portions of the passage 66 when the valve is in open position, and to cut off such communication when in closed position. The operation of the valve is controlled by a cam groove 67 formed in an annular extension 68 upon the head 24 and coöperating with a reciprocating rack 69 meshing with a pinion 70 upon the stem of the valve 40. As illustrated particularly in Fig. 1 and by the diagrams of Figs. 16 to 20, inclusive, the valve 40 is open only for approximately a fourth of each revolution of the engine. The exhaust passage from the secondary chamber 56 to atmosphere extends from a port 71 in the wall 28 of the outer cylinder, through passage 72 in the annular head 30, annular passage 73 extending around the head 24, passage 74 through the head 24 and compartment 75 in the spindle 21 to atmosphere. As illustrated more particularly in Fig. 11, the circuit for the spark plug 39 is made and broken upon each revolution of the engine by contact-finger 76, which is secured to a bracket 77 mounted upon the fixed head 23. A wire 78, forming part of the electric circuit, is connected to the contact-finger 76.

In the operation of the engine, the rotation of the vane 37 draws fuel through the passage 57 and port 58 into the primary chamber 55. It also compresses the previous charge and advances it upon the opening of valve 40 into the secondary chamber 56 in the rear of the vane 37. The subsequent explosion by the action of the spark plug 39 advances the vane and its connected parts to expel the gases and other products of combustion resulting from the explosion of the previous charge to atmosphere. The various positions of the parts are illustrated in Figs. 15 to 20, inclusive. In Fig. 15, the parts are in position for the application of the spark. A fresh charge has been drawn into the primary chamber 55. A charge has been compressed in the chamber formed to the right of the vane 37 and between the inner and outer cylinders. The valve 40 has been closed. Upon the application of the spark, this compressed charge is exploded and the parts are advanced, moving to the position illustrated in Fig. 16. In passing to this position, the vane has expelled some of the products of combustion from the secondary chamber 56 through the exhaust port 71. The continued movement of the parts brings them to the position illustrated in Fig. 17, wherein the products of combustion in the secondary chamber 56 are about expelled and the compression of the charge in the primary chamber is just begun. In the movement of the parts to the position of Fig. 18, the products of combustion have all been expelled from the secondary chamber 56, the charge in the primary chamber has been partially compressed, and part of a new charge drawn in. The valve 40 still remains closed, but is about to be opened through the agency of the cam track 67. A slight advance from the position of Fig. 18 to that of Fig. 19 brings about this opening of valve 40 and the compressed gas in chamber 55 is free to pass into the secondary chamber 56 as soon as the advance of the inner cylinder will permit. In Fig. 20, the parts are shown in the position they occupy after the compressed charge has been admitted to the explosion chamber and just before the firing position of Fig. 15 is reached. In this view, the compressed charge is almost all expelled from the primary chamber and the latter has just about completed the taking in of a fresh charge. In the movement of the parts from the position of Fig. 20 to Fig. 15, the valve 40 is closed and the compressed charge in the rear of the vane is ready to be exploded, as before explained.

It will be noted that at the time the charge is exploded, the inner ring 38, by reason of its engagement with the outer cylinder 27, hub 36 and retaining pins 43, 44, will not move from the position illustrated. Likewise the pressure upon the outer cylinder 27 will be resisted by the spindle 21. The vane 37 will alone yield to the pressure of the explosion. It will carry around with it the outer cylinder and, to a certain extent, the inner cylinder. The latter acts as an abutment at the time of exploding the charge and, by reason of its engagement with the vane near the spindle, applies the resulting back pressure advantageously, the pressure tending to advance being applied to the outer end of the vane. As the parts rotate, the inner cylinder advances at a slower rate than the outer cylinder, but the friction between them is small because of the rolling engagement. The same is true of the engagement of the inner cylinder with the hub. It will also be noted that at the time of the explosion of the charge, any movement of the inner cylinder downward, as viewed in Figs. 4 and 15, will only tighten the engagement between it and the outer cylinder and thereby still further reduce the possibility of leakage. Under this same pressure, the rollers and arcuate strips, associated with the slot in the inner cylinder through which the vane passes, will also operate to reduce the possibility of leakage. The rollers will act also to reduce friction between the parts. Furthermore, the retarding friction of the parts is also reduced by having the engagement between the moving element and the fixed heads 23 and 24 close to the spindle 21. In this way, the moment applied in opposition to the advance of the engine is reduced to a minimum. It will also be noted that the distribution of the wearing parts upon the spindle is such as to bring about an even wear.

In practising my invention, it will be apparent that the power generated by it may be applied to do useful work in any approved manner, as by gearing or belting. If desired, the latter might be applied directly to the exterior of the outer cylinder 27. Other ways of applying it will suggest themselves. It will also be apparent that many alterations and modifications may be made in the specific embodiment of the invention herein disclosed without departing from its spirit and scope. I, therefore, do not wish to be limited to the specific disclosure contained herein, but aim to cover all such alterations and modifications by the terms of the appended claims.

What I claim is new and desite to secure by Letters Patent of the United States is:—

1. A rotary internal combustion engine comprising an inner fixed member, an outer rotary member concentrically mounted relative to said fixed member, an intermediate rotary member mounted eccentrically relative to said inner and outer members, said intermediate member forming one chamber with said inner member and another chamber with said outer member, means for supplying fuel to one of said chambers for compression in said chamber, means for conducting compressed charges from that chamber to the other chamber, and means for firing said charges in the latter chamber.

2. A rotary internal combustion engine comprising a fixed spindle, a hub rotatable upon said spindle, a cylinder secured to said hub and rotatable therewith about said spindle, an intermediate rotary member mounted eccentrically relative to said hub and cylinder, said intermediate member forming a compression chamber with said hub and an explosion chamber with said cylinder, means for supplying fuel to the compression chamber, means for conducting compressed charges from the compression chamber to the explosion chamber, and means for firing said charges in the latter chamber.

3. A rotary internal combustion engine comprising a fixed spindle, a hub rotatable upon said spindle, a cylinder secured to said hub and rotatable therewith about said spindle, an intermediate rotary member mounted eccentrically relative to said hub and cylinder, said intermediate member forming a compression chamber with said hub and an explosion chamber with said cylinder, a fuel source communicating with said compression chamber through an opening in a portion of said spindle, an exhaust opening from the explosion cylinder through another portion of said spindle, said intermediate member operating to draw in charges of fuel from said source and compress the same and discharge the combusted gases of previously exploded charges through said exhaust opening, and means for exploding compressed charges to operate said intermediate member.

4. A rotary internal combustion engine comprising a fixed inner member, an outer rotary member concentrically mounted relative to said inner member, an intermediate rotary member mounted eccentrically relative to said inner and outer members, said members forming primary and secondary chambers and operative to compress fuel charges in said primary chamber, means for controlling the passage of compressed charges from said primary chamber to said secondary chamber, and means for exploding compressed charges in said secondary chamber.

5. A rotary internal combustion engine comprising a fixed inner member, an outer rotary member concentrically mounted relative to said inner member, an intermediate rotary member mounted eccentrically relative to said inner and outer members, said members forming primary and secondary chambers and operative to compress fuel charges in said primary chamber, means responsive to the rotation of said rotary members to control the passage of compressed charges from said primary chamber to said secondary chamber, and means for exploding compressed charges in said secondary chamber.

6. A rotary internal combustion engine comprising an inner member, an outer rotary member, an intermediate rotary member, a primary chamber and a secondary chamber formed in part by said members, a source of fuel supply, means for exploding a charge of fuel in said secondary chamber, a vane coöperating with the walls of said chambers in response to such explosion to expel the products of combustion of the preceding exploded charge from said secondary chamber, to compress the next charge in said primary chamber, and to draw a fresh charge into said primary chamber, and a valve operated in response to the operation of said vane to admit the charge compressed in said primary chamber into said secondary chamber in position to be exploded.

7. A rotary internal combustion engine comprising a fixed inner member, an outer rotary member concentrically mounted relative to said inner member, an intermediate rotary member mounted eccentrically relative to said inner and outer members, said members forming primary and secondary chambers, a firing device in said secondary chamber, a fuel source in communication through passages in said fixed member with said primary chamber, means for controlling passages in said outer member between the primary and secondary chambers, and said outer member having openings for the discharge of combusted gases.

8. A rotary internal combustion engine comprising a fixed inner member, an outer rotary member concentrically mounted relative to said inner member and having a radial vane connected at its inner end to said inner member, an intermediate member mounted eccentrically relative to said inner and outer members and split so as to embrace said vane said members forming primary and secondary chambers, a fuel source in communication through passages in said fixed member with said primary chamber, means for controlling passages in said outer member between the primary and secondary chambers, and said outer member having openings for the discharge of combusted gases.

9. A rotary internal combustion engine comprising an outer rotatable cylinder, a concentric cylindrical hub, a support on which said hub is rotatably mounted, an inner eccentric cylinder surrounding said hub and bearing at diametrically opposite points against the inside of said outer cylinder and the outside of said hub respectively, a vane between said hub and outer cylinder and extending through a slot in said inner cylinder, and firing means behind said vane.

10. A rotary internal combustion engine comprising an outer rotatable cylinder, a concentric cylindrical hub, a support on which said hub is rotatably mounted, an inner eccentric cylinder surrounding said hub and bearing at diametrically opposite points against the inside of said outer cylinder and the outside of said hub respectively, a vane between said hub and outer cylinder and extending through a slot in said inner cylinder, a passage connecting the interiors of said cylinders through said vane for supplying fuel to the rear of said vane, and means for exploding the fuel charges thus supplied to rotate said vane and its connected parts upon said support.

11. A rotary internal combustion engine comprising an outer rotatable cylinder, a concentric cylindrical hub, a support on which said hub is rotatably mounted, an inner eccentric cylinder surrounding said hub and bearing at diametrically opposite points against the inside of said outer cylinder and the outside of said hub respectively, a vane between said hub and outer cylinder and extending through a slot in said inner cylinder, a passage for supplying fuel extending from a point in said inner cylinder forward of said vane and adjacent to the point of engagement of said hub and inner cylinder through said vane to a point within the outer cylinder just rearward of said vane, and means for exploding charges of fuel thus supplied to rotate said vane and its connected parts about said support.

12. A rotary internal combustion engine comprising an outer rotatable cylinder, a concentric cylindrical hub, a support on which said hub is rotatably mounted, an inner eccentric cylinder surrounding said hub and bearing at diametrically opposite points against the inside of said outer cylinder and the outside of said hub respectively, a vane between said hub and outer cylinder and extending through a slot in said inner cylinder, a passage for supplying fuel extending from a point in said inner cylinder just forward of said vane and just to one side of the point of engagement of said hub and inner cylinder, through said vane to a point within the outer cylinder just rearward of said vane, a valve for controlling said passage, and means for exploding charges of fuel thus supplied to rotate said vane and its connected parts about said support.

13. A rotary internal combustion engine comprising an outer cylinder, a concentric cylindrical hub, a support on which said hub is rotatably mounted, an inner eccentric cylinder surrounding said hub and bearing at diametrically opposite points against the inside of said outer cylinder and the outside of said hub respectively, a vane between said hub and outer cylinder and extending through a slot in said inner cylinder, a passage for supplying fuel extending from a point in said inner cylinder just forward of said vane and just to one side of the point of engagement of said hub and inner cylinder, through said vane to a point within the outer cylinder just rearward of said vane, a valve for controlling said passage, a cam and connections for operating said valve in response to the rotation of the engine, and means for exploding charges of fuel thus supplied to rotate said vane and its connected parts about said support.

14. A rotary internal combustion engine comprising an outer cylinder, a concentric cylindrical hub, a support on which said hub is rotatably mounted, an inner eccentric cylinder surrounding said hub and bearing at diametrically opposite points against the inside of said outer cylinder and the outside of said hub respectively, a vane between said hub and outer cylinder and extending through a slot in said inner cylinder, a passage extending from a point in said inner cylinder just forward of said vane and just to one side of the point of engagement of said hub and inner cylinder, through said vane to a point within the outer cylinder just rearward of said vane, a valve for controlling said passage, a fuel inlet passage to said inner cylinder just to the other side of the point of engagement of said inner cylinder and hub from the outlet point of said passage, an exhaust passage leading from the interior of said outer cylinder just forward of said vane, a spark plug within said outer cylinder just to the rear of said vane, a source of fuel, a cam and connections for operating said valve, and a contact-finger and electrical connections for operating said spark plug, whereby fuel drawn into said inner cylinder is compressed, admitted to the rear of the vane in the outer cylinder and exploded to rotate the vane and its connected parts about said support.

15. A rotary internal combustion engine comprising a support, a vane rotatable upon said support, an outer casing member fixed to said vane, an inner member intermediate of said support and outer member and eccentrically arranged relative thereto, fuel connections for supplying fuel charges to the interior of said inner member to be compressed therein by said vane, said parts having passages for conducting the compressed charges to the rear of the outer end of the vane and between said inner and outer members, and firing means adjacent to the outer end of said vane for exploding the fuel charges.

16. A rotary internal combustion engine comprising a support, a vane and outer shell fixed relative to each other and rotatable as a unit about said support, an intermediate member coöperating with said shell and vane to compress fuel charges and advance said shell and vane as the result of the explosion of said charges, and means for supplying and exploding fuel charges, the points of frictional engagement of said support with said shell and vane being adjacent to the center of rotation.

17. A rotary internal combustion engine comprising a spindle, heads fixed to said spindle, a shell having ends apertured to fit about and travel upon the peripheries of said heads, a hub upon said spindle between said heads, a vane connecting said shell and hub, a member in said shell coöperating with said vane and shell to form an explosion chamber, and means for exploding fuel in said chamber to rotate said movable parts.

18. A rotary internal combustion engine comprising a support, a member rotatable on said support, a second rotatable member forming a compression chamber and an explosion chamber with said first member, said support and members being provided with passages for supplying charges of fuel to said compression chamber and leading the compressed charges to said explosion chamber, and said members being connected together, and means for firing compressed charges in said explosion chamber.

19. A rotary internal combustion engine comprising a support, a vane rotatable on said support, outer and inner eccentric curved walls forming an explosion chamber with said vane, said outer wall being fixed to said vane and movable with same, said support, vane and walls being provided with passages for supplying fuel and conducting charges compressed by said vane to said explosion chamber, and means for firing such charges in said chamber.

20. A rotary internal combustion engine comprising a support, a rotary outer casing, a vane rotatable on said support and with said outer casing, a split ring in said casing forming a chamber in its interior in which a fuel charge is compressed by said vane and forming with said outer casing a second chamber into which said compressed charge is conducted and exploded behind said vane, said parts being provided with passages for thus supplying and conducting the charge, and firing means for exploding the charge.

21. A rotary internal combustion engine comprising a support, a rotary outer casing, a vane rotatable on said support and with said outer casing, a split ring in said casing forming a chamber in its interior in which a fuel charge is compressed by said vane and forming with said outer casing a second chamber into which said compressed charge is conducted and exploded behind said vane, said vane and outer casing being provided with a passage for conducting the charge from the first mentioned chamber to the second, and means for exploding the compressed charge behind said vane.

22. A rotary internal combustion engine comprising a support, a vane and outer shell fixed relative to each other and rotatable as a unit on said support, a member rotatable within said shell and forming a compression chamber on its interior and an explosion chamber on its exterior with said shell and vane, and means for exploding fuel supplied to said chamber to rotate said vane and shell about said support.

23. A rotary internal combustion engine comprising a support, a vane and outer shell fixed relative to each other and rotatable as a unit on said support, a member within said shell forming a compression chamber on its interior and an explosion chamber on its exterior with said shell and vane and being movable at its points of engagement with said vane and shell, and means for exploding fuel supplied to said chamber to rotate said vane and shell about said support.

24. A rotary internal combustion engine comprising a support, a vane and outer shell fixed relative to each other and rotatable as a unit about said support, a member within said shell movable about said support relative to said shell and forming with said shell and vane a compression chamber on its interior and an explosion chamber on its exterior, and means for exploding fuel supplied to said chamber to rotate said vane, shell and member about said support.

25. A rotary engine comprising outer and inner cylinders, a rotatable vane extending through a slot in the latter, members for engaging the latter to hold it in position, said members extending into the path of rotation of said vane, and cam mechanism for withdrawing said members one after the other to clear the path for said vane while still holding said inner cylinder in position.

26. A rotary engine comprising a support, a vane and outer shell fixed relative to each other and rotatable as a unit about said support, a member within said shell movable relative to said shell, retaining members extending through said support and operating to hold said member in a definite position in said shell, said retaining members extending into the path of rotation of said vane, and cam mechanism for withdrawing said members one after the other to clear the path for said vane while still retaining said member in position.

In witness whereof, I hereunto subscribe my name this 5th day of February, 1912.

CHARLES J. CLARK.

Witnesses:
CAROLYN WEBER,
T. H. FERGUSON.

Copies of this patent may be obtained for five cents each, by addressing the "Commissioner of Patents Washington, D. C."

It is hereby certified that in Letters Patent No. 1,146,848, granted July 20, 1915, upon the application of Charles J. Clark, of Chicago, Illinois, for an improvement in "Rotary Gas-Engines," errors appear in the printed specification requiring correction as follows: Page 4, line 5, for the words "is new and deside" read *as new and desire;* same page, line 100, after the word "chamber" insert the words *through passages in said vane;* and that the said Letters Patent should be read with these corrections therein that the same may conform to the record of the case in the Patent Office.

Signed and sealed this 17th day of August, A. D., 1915.

[SEAL.]

J. T. NEWTON,
*Acting Commissioner of Patents.*